United States Patent
Feuerstack et al.

(10) Patent No.: US 9,178,365 B2
(45) Date of Patent: Nov. 3, 2015

(54) SYSTEM FOR CHARGING AN ENERGY STORE, AND METHOD FOR OPERATING THE CHARGING SYSTEM

(75) Inventors: Peter Feuerstack, Ludwigsburg (DE); Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 13/984,560

(22) PCT Filed: Dec. 29, 2011

(86) PCT No.: PCT/EP2011/074216
§ 371 (c)(1),
(2), (4) Date: Aug. 9, 2013

(87) PCT Pub. No.: WO2012/107146
PCT Pub. Date: Aug. 16, 2012

(65) Prior Publication Data
US 2013/0307445 A1    Nov. 21, 2013

(30) Foreign Application Priority Data
Feb. 9, 2011 (DE) .......................... 10 2011 003 869

(51) Int. Cl.
*H02P 1/00* (2006.01)
*H02P 3/00* (2006.01)
(Continued)

(52) U.S. Cl.
CPC ........... *H02J 7/0013* (2013.01); *B60L 11/1803* (2013.01); *H02J 7/0014* (2013.01);
(Continued)

(58) Field of Classification Search
CPC ............ Y02T 10/7005; Y02T 10/7061; Y02T 10/7066; H02J 7/0024
USPC ........................................................ 318/139
See application file for complete search history.

(56) References Cited

U.S. PATENT DOCUMENTS

| 5,341,075 A | 8/1994 | Cocconi |
| 6,058,032 A * | 5/2000 | Yamanaka et al. .............. 363/71 |

(Continued)

FOREIGN PATENT DOCUMENTS

| DE | 19736414 | 3/1998 |
| DE | 102010027857 | 10/2011 |
| DE | 102010027861 | 10/2011 |

OTHER PUBLICATIONS

International Search Report for Application No. PCT/EP2011/074216 dated Mar. 27, 2012 (2 pages).

*Primary Examiner* — Erick Glass
(74) *Attorney, Agent, or Firm* — Michael Best & Friedrich LLP

(57) ABSTRACT

The invention relates to a system for charging at least one energy storing cell (5) in a controllable energy store (2) that is used to control and supply electric energy to an n-phase electric machine (1), wherein n>1. The controllable energy store (2) has n parallel energy supply branches (3-1, 3-2, 3-3), each of which has at least two serially connected energy storing modules (4), each said energy storing module comprising at least one electric energy storing cell (5) with a corresponding controllable coupling unit (6). The energy supply branches (3-1, 3-2, 3-3) can be connected to a reference bus (T-), and each energy supply branch can be connected to a phase (U, V, W) of the electric machine (1). The coupling units (6) bridge the respective corresponding energy storing cells (5) or connect same into the respective energy supply branch (3-1, 3-2; 3-3) dependent on control signals. The aim of the invention is to allow at least one energy storing cell (5) to be charged. This is achieved in that an external energy source (10) can be connected to a neutral point (S) of the electric machine (1) and to the reference bus (T-).

10 Claims, 3 Drawing Sheets

(51) Int. Cl.
   *H02P 5/00* (2006.01)
   *H02J 7/00* (2006.01)
   *B60L 11/18* (2006.01)
   *H02J 7/14* (2006.01)

(52) U.S. Cl.
   CPC ............ *H02J 7/0024* (2013.01); *H02J 7/0055* (2013.01); *H02J 7/1492* (2013.01); *H02J 2007/0059* (2013.01); *H02J 2007/0067* (2013.01); *Y02E 10/766* (2013.01); *Y02T 10/7005* (2013.01); *Y02T 10/7055* (2013.01); *Y02T 10/92* (2013.01)

(56) References Cited

U.S. PATENT DOCUMENTS

| | | | |
|---|---|---|---|
| 6,236,580 B1 * | 5/2001 | Aiello et al. | 363/37 |
| 7,782,015 B1 | 8/2010 | Aaron | |
| 2010/0072824 A1 * | 3/2010 | Abolhassani et al. | 307/82 |
| 2011/0199032 A1 * | 8/2011 | Ueda et al. | 318/430 |

* cited by examiner

SYSTEM FOR CHARGING AN ENERGY STORE, AND METHOD FOR OPERATING THE CHARGING SYSTEM

BACKGROUND OF THE INVENTION

The invention relates to a system for charging an energy store and a method for operating the charging system according to the invention.

It appears that electronic systems, which combine new energy storage technologies with electric drive technology, will increasingly be used in the future in stationary applications, such as, e.g., wind turbines, as well as in motor vehicles, such as hybrid and electric vehicles. In conventional applications, an electric machine, which, e.g., is embodied as an induction machine, is controlled via an electrical energy converter in the form of an inverter. A so-called DC link, via which an energy store, typically a battery, is connected to the DC side of the inverter, is characteristic of such systems. In order to be able to meet the requirements for performance and energy necessary for any given application, a plurality of battery cells is connected in series. Because the current provided from such an energy store has to flow through all of the battery cells and a battery cell can conduct only a limited current, battery cells are often additionally connected in parallel in order to increase the maximum current.

Besides having a high total voltage, the series connection of a plurality of battery cells poses the problem that the entire energy store fails if a single battery cell fails. As a result, battery current can no longer flow. Such a failure of the energy store can lead to a failure of the total system. In the case of a motor vehicle, a failure of the drive battery can lead to a breakdown of the vehicle. In other applications, such as, e.g., the rotor blade adjustment of wind turbines, situations which endanger safety can even arise when outside conditions are unfavorable, such as, e.g., when strong winds prevail. It is therefore always the goal to achieve a high degree of reliability of the energy store, wherein "reliability" refers to the capability of a system to operate in an error-free manner for a predetermined amount of time.

In the earlier German patent applications DE 10 2010 027857 and DE 10 2010 027861, batteries comprising a plurality of battery module lines are described which can be directly connected to an electric machine. The battery module lines have a plurality of battery modules connected in series. Each battery module comprises at least one battery cell and a corresponding controllable coupling unit, which allows said module to disconnect the respective battery module line or to bridge the at least one respective corresponding battery cell or connect said at least one respective corresponding battery cell into the respective battery module line as a function of control signals. By suitably actuating the coupling units, e.g. with the aid of pulse width modulation, suitable phase signals for controlling the electric machine can also be provided so that a separate pulse width modulated inverter can be eliminated. The pulse width modulated inverter required for controlling the electric machine is thereby for all intents and purposes integrated into the battery. For the purpose of disclosure, these two earlier applications are completely incorporated into the present application.

SUMMARY OF THE INVENTION

The invention provides a system for charging at least one energy storing cell in a controllable energy store that is used to control and supply electric energy to an n-phase electric machine, wherein n≥1. The controllable energy store has n parallel energy supply branches, each of which has at least two serially connected energy storing modules, each said energy storing module comprising at least one electric energy storing cell with a corresponding controllable coupling unit. The energy supply branches can be connected to a reference bus, and each energy supply branch can be connected to a phase of the electric machine. The coupling units bridge the respective corresponding energy storing cells or they connect said respective corresponding energy storing cells into the respective energy supply branch. An external energy source can be connected both to a star point of the electric machine and the reference bus.

The invention further provides a method for operating a charging system according to the invention, wherein the energy storing cells in all of the energy supply branches are simultaneously charged.

The invention is based on the basic concept that in order to charge the energy storing cells, the energy supply branches are electrically connected to an external energy source without interconnecting an additional charging component. The connection can thereby take place either directly or via the star point of the electric machine.

Besides saving on additional charging components, the system according to the invention is characterized in that a simultaneous charging of energy storing cells in all of the energy supply branches, in particular even a simultaneous charging of all of the energy storing cells of the controllable energy store, is possible in the case of charging currents which can be individually adjusted by the controllable energy store.

According to one embodiment of the invention, the external energy source, which can be connected to the star point of the electric machine, is embodied as a current source. The embodiment as current source has the advantage that said current source can be connected in parallel to the controllable energy store acting as voltage source without further measures having to be taken. This results from the fact that the charging current is automatically limited by the current source.

As an alternative thereto, the external energy source, which can be connected to the star point of the electric machine, can, however, also be embodied as a voltage source, the voltage value of which lies below the voltages of the energy supply branches. Because the charging current is not automatically limited by the voltage source, said voltage source cannot necessarily be connected in parallel to the controllable energy store acting as voltage source. This problem is however solved by virtue of the fact that, the coupling units in combination with the motor inductances of the electric machine can be operated as boost converters. In combination with a boost converter, a voltage source, however, takes on a "current source character", and therefore an additional charging component is also not required when using a voltage source as external energy source.

If the inductances of the stator windings of the electric machine are not sufficient, an additional charging inductance can be connected between the charging device and the electric machine or between the charging device and the controllable energy store.

If the electric machine has at least two phases and thus the controllable energy store has at least two parallel energy supply branches, a distribution of a current fed by the voltage source to the energy supply branches can be adjusted via the voltages of the energy supply branches. The voltages of the energy supply branches are thereby determined by the number of energy storing cells connected into the respective energy supply branch. With the aid of the coupling units of the controllable energy store, the charging current can thus be individually adjusted in the individual energy supply branches.

According to one embodiment of the invention, the energy source which can be connected to the star point of the electric machine is embodied as a DC voltage source or a DC current source. If the coupling units of the controllable energy store are, however, designed as full bridges, the energy source can then be alternatively embodied as an AC voltage source or as an AC current source.

Undesirable moments during the charging process can be prevented as a result of the electric machine being mechanically blocked during the charging process, e.g., with the aid of a transmission pawl. As an alternative, the rotor position of the electric machine can also be monitored, e.g., with the aid of corresponding sensors and in the event of a detected rotor movement be switched off.

Further features and advantages of embodiments of the invention ensue from the following description with reference to the attached drawings.

DETAILED DESCRIPTION

Figure 1:
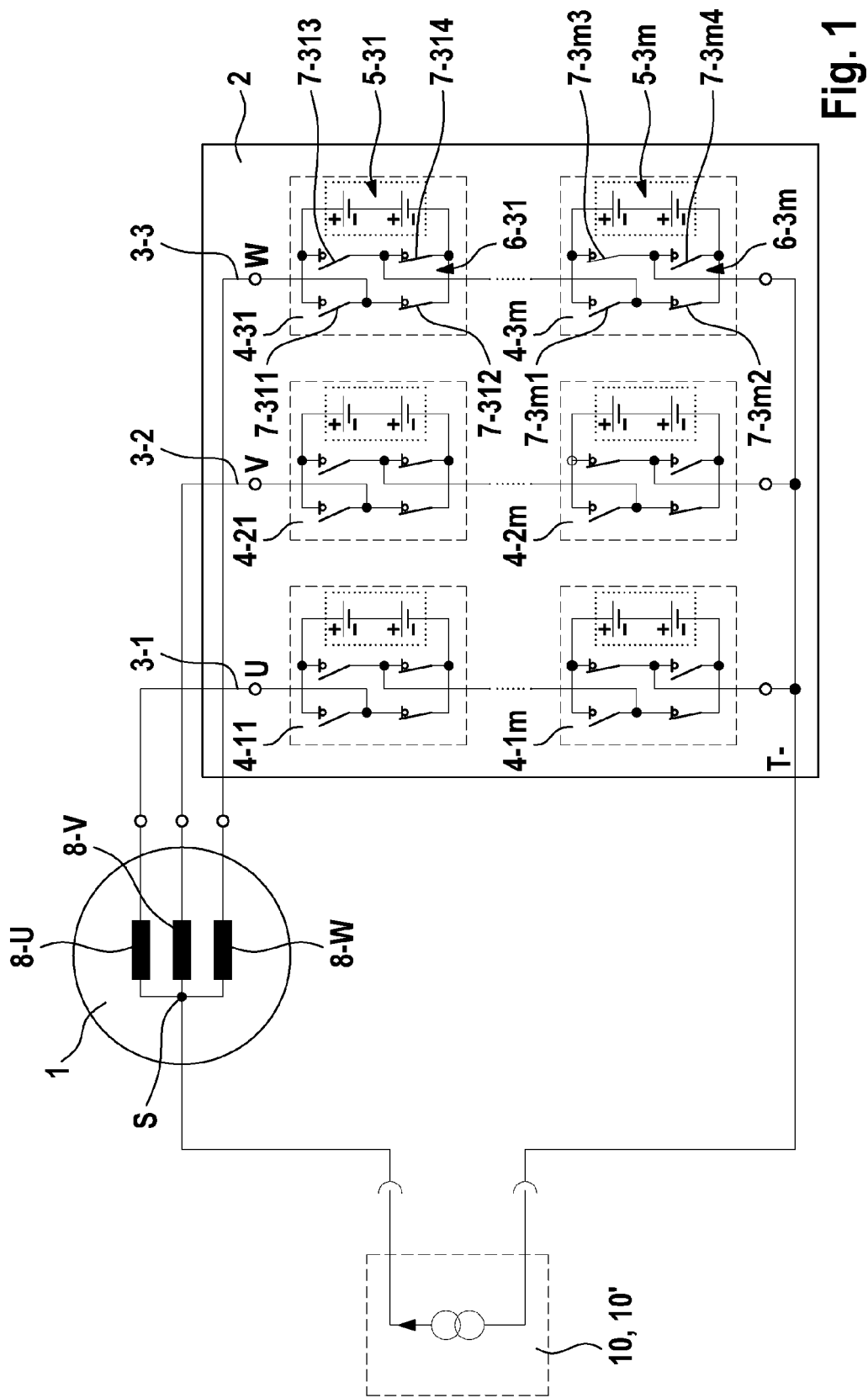
FIG. 1 shows a schematic depiction of a first embodiment of a charging system according to the invention.
Figure 2:
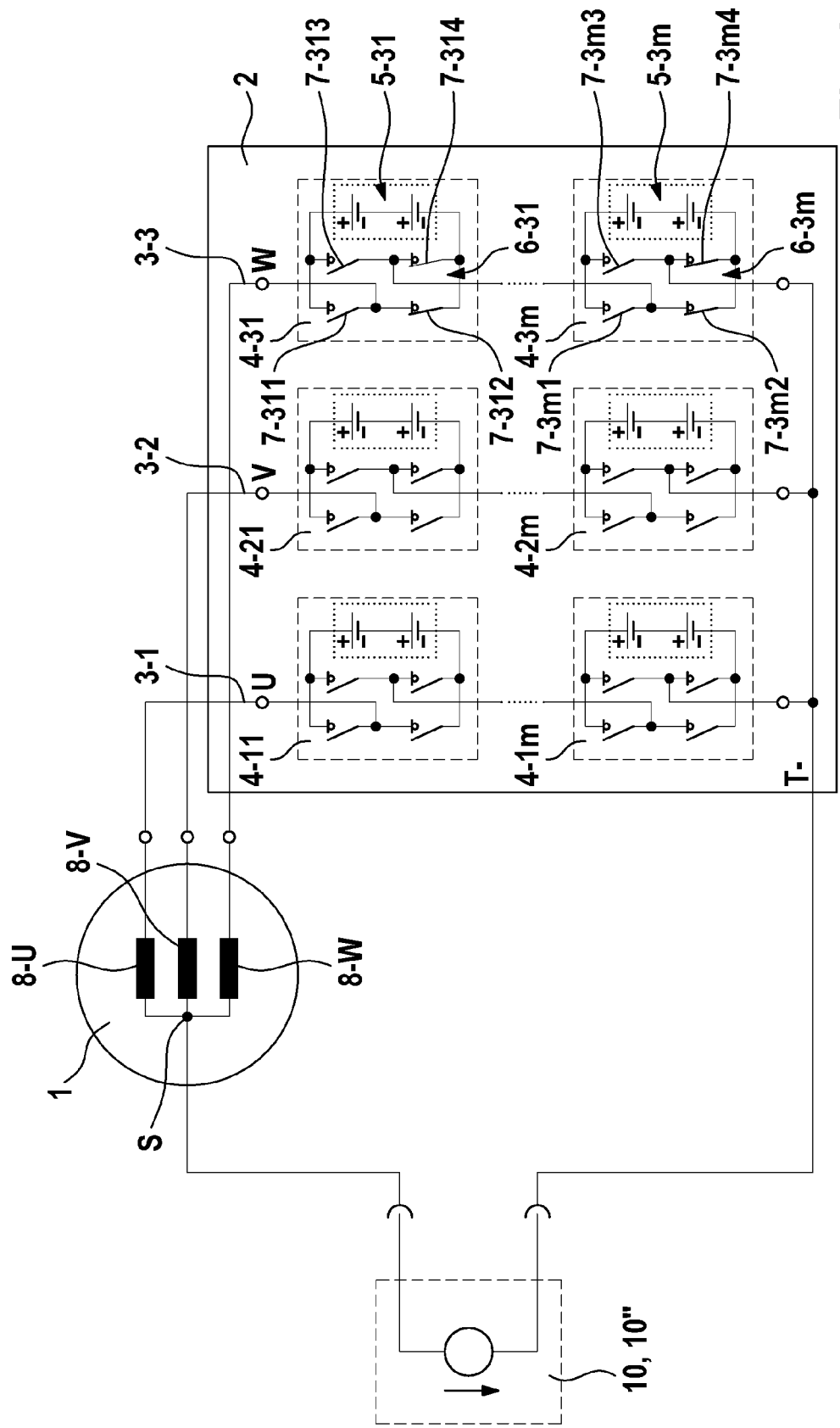
FIG. 2 shows a schematic depiction of a second embodiment of a charging system according to the invention in a charging phase and FIG. 3 shows the charging system pursuant to FIG. 2 in a free-wheeling phase.
Figure 3:
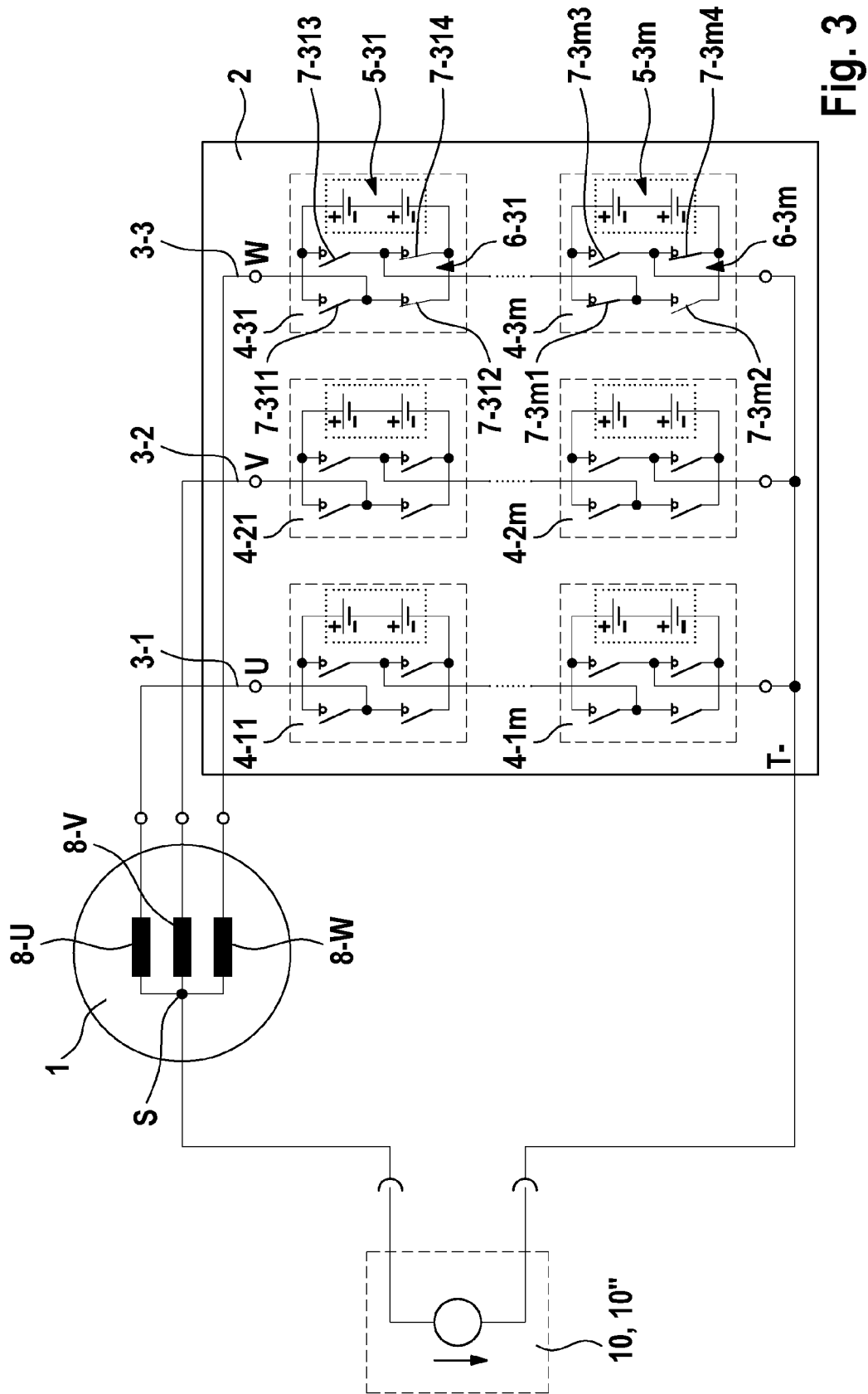

The FIGS. 1 to 3 show schematic depictions of embodiments of a charging system according to the invention. A controllable energy store 2 is connected up to a three-phase electric machine 1. The controllable energy store 2 comprises three energy supply branches 3-1, 3-2 and 3-3, which are connected on the one hand to a reference potential T- (reference bus), which carries a low potential in the depicted embodiments, and on the other hand respectively to individual phases U, V, W of the electric machine 1. Each of the energy supply branches 3-1, 3-2 and 3-3 have serially connected energy storing modules 4-11 to 4-1$m$ or 4-21 to 4-2$m$ or 4-31 to 4-3$m$, wherein m≥2. The energy storing modules 4 comprise in turn respectively a plurality of serially connected, electric energy storing cells, which for reasons of clarity are provided with reference numerals 5-31 to 5-3$m$ only in the energy supply branch 3-3 connected to the phase W of the electric machine 1. The energy storing modules 4 further comprise respectively one coupling unit, which is associated with the energy storing cells 5 of the respective energy storing module 4. For reasons of clarity, the coupling units are also provided with reference numerals 5-31 to 5-3$m$ only in the energy supply branch 3-3. In the depicted embodiment variants, the coupling units 6 are formed in each case by four controllable switching elements 7-311, 7-312, 7-313 and 7-314 to 7-3$m$1, 7-3$m$2, 7-3$m$3 and 7-3$m$4, which are interconnected in the form of a full bridge. The switching elements can thereby be embodied as power semiconductor switches, e.g., in the form of IGBTs (Insulted Gate Bipolar Transistors) or as MOSFETs (Metal Oxide Semiconductor Field-Effect Transistors).

The coupling units 6 allow the respective energy supply branch 3 to be interrupted by opening all of the switching elements 7 of a coupling unit 6. The energy storing cells 5 can alternatively either be bridged by closing respectively two of the switching units 7 of a coupling unit 6, e.g. closing the switches 7-312 and 7-314 or be switched into the respective energy supply branch 3, e.g. closing the switch 7-312 and 7-313.

The total output voltages of the energy supply branches 3-1 to 3-3 are determined by the respective switching state of the controllable switching elements 7 of the coupling units 6 and can be adjusted in a stepped manner. The step range results as a function of the voltage of the individual energy storing modules 4. If the use of the preferred embodiment of uniformly designed energy storing modules 4 can be assumed, a maximum possible total output voltage thus results from the voltage of a single energy storing module 4 times the number m of the serially connected energy storing modules 4 per energy supply branch 3.

The coupling units 6 thereby allow the phases U, V, W of the electric machine 1 to either be switched in opposition to a high reference potential or a low reference potential and can in this respect fulfill the function of a known inverter. During suitable actuation of the coupling units 6, power and operating mode of the electric machine 1 can thus be controlled by means of the controllable energy store 2. The controllable energy store 2 therefore fulfills in this respect a double function because said energy store on the one hand supplies the electric machine 1 with energy and on the other hand also controls said electric machine 1.

The electric machine 1 has stator windings 8-U, 8-V and 8-W, which are connected in a known manner to one another in a star connection.

The electric machine 1 is embodied as a three-phase machine in the exemplary embodiments depicted, can, however, have less or more than three phases. The number of energy supply branches 3 in the controllable energy store 2 is, of course, also determined by the number of phases of the electric machine.

In the exemplary embodiments depicted, each energy storing module 4 has respectively a plurality of serially connected energy storing cells 5. The energy storing modules 4 can, however, alternatively also have respectively only one single energy storing cell or also energy story cells connected in parallel.

In the exemplary embodiments depicted, the coupling units 6 are formed in each case by four controllable switching elements 7 in the form of a full bridge, which also makes the option available for a voltage reversal at the output of the energy storing module. The coupling units 6 can, however, also be implemented using more or fewer controllable switching elements so long as the necessary functions (bridging the energy supply cells and connecting said energy supply cells into the energy supply branch) can be implemented. In particular, the coupling units can also be embodied in the form of half bridges. Such embodiments ensue by way of example from the earlier German patent applications DE 10 2010 027857 and DE 10 2010 027861.

In order to make the charging of energy storing cells 5 of one or a plurality of energy storing modules 4 possible, an external energy source 10 embodied as a current source 10 is connected on the one hand to a star point S of the electric machine and on the other hand to the reference bus T-. The current source 10' can thereby be embodied as a DC current source or, in the depicted embodiment of the coupling units as full bridges, as an AC current source and provides a suitable charging current for charging the energy storing cells 5.

FIGS. 2 and 3 show a second embodiment of the invention. This differs from the first embodiment by the fact that the external energy source 10 is not designed as a current source but as a voltage sources 10", the voltage value of which lies below the voltages of the energy supply branches 3-1 to 3-3. The voltage source 10" can be implemented as a DC voltage source or in the embodiment of the coupling units 6 as full bridges also as an AC voltage source. In order also in the case of a voltage source 10" to be able to provide a charging current suitable for charging the energy storing cells 5, the charging process has to thereby take place in two phases. This charging process is described exemplarily below for the charging process of the energy storing cells 5 of an individual energy storing module 4, namely the energy storing cells 5-3*m* of the energy storing module 4-3*m* in the energy supply branch 3-3, with the aid of a voltage source 10" embodied as a DC voltage source. The coupling units 6 are thereby operated in combination with the motor inductances 8 of the electric machine 1 as boost converters.

During a charging phase, which is depicted in FIG. 2, the coupling units 6-31 to 6-3*m* of the energy storing modules 4-31 to 4-3*m*, which lie in the energy supply branch 3-3, in which the energy storing cells 5-31 to be charged also lie, are controlled by a non-depicted control unit, such that the respectively corresponding energy storing cells 5-31 to 5-3*m* are bridged. This is concretely achieved by virtue of the fact that the switching elements 7-312 and 7-314 to 7-3*m*2 and 7-3*m*4 are closed, whereas the switching elements 7-311 and 7-313 to 7-3*m*1 and 7-3*m*3 are open. All remaining coupling units 6, i.e. all coupling units 6 in the energy storing modules 4 of the other two energy supply branches 3-1 and 3-2 are controlled such that the respective energy supply branch 3-1 or, respectively, 3-2 is interrupted. This is achieved concretely as a result of all switching elements 7 of the coupling units being open in each case.

Such an activation of the coupling units 6 causes a current flow through the stator winding 8-W; thus enabling electrical energy to be stored in said stator winding 8-W during the charging phase.

In a free-wheeling phase subsequent to the charging phase, which free-wheeling phase is depicted in FIG. 3, the coupling unit 6-3*m*, which is associated with the energy storing cells 5-3*m*, is controlled such that the corresponding energy storing cells 5-3*m* are connected into the energy supply branch 3-3. This is concretely achieved as a result of the switching elements 7-3*m*2 and 7-3*m*3 being open and the switching elements 7-3*m*1 and 7-3*m*4 being closed. All remaining coupling units 6-31 to 6-3(*m*–1), which lie in the energy supply branch 3-3 of the energy storing cells 5-3*m* to be charged but themselves are not associated with any energy storing cells 5 to be charged, are controlled such that the respectively corresponding energy storing cells 5-31 to 5-3(*m*–1) are bridged (closing of the switching elements 7-312 and 7-314 to 7-3(*m*–1)2 to 7-3(*m*–1)4 and opening of the switching elements 7-311 and 7-313 to 7-3(*m*–1)1 to 7-3(*m*–1)3). The coupling units 6-11 to 6-1*m* and 6-21 to 6-2*m* in the remaining energy supply branches 3-1 and 3-2 are furthermore controlled such that the respective energy supply branches 3-1 and 3-2 are interrupted.

Such a control of the coupling units 6 brings about an electrical connection between the stator winding 8-W and the energy storing cells 5-3*m* to be charged. The inductance of the stator winding 8-W thereby drives the current further on and thus charges the energy storing cells 5-3*m*.

If the motor inductances are not sufficient, an additional external charging inductance is employed, which is connected between the star point S and the electrical machine 1.

In the manner described above, practically all energy storing cells 5 in all of the energy supply branches 3 of the controllable energy store 2 can be charged. Using the inventive system, it is, however, also possible by means of a corresponding actuation of the coupling units 6 to charge a plurality of energy storing cells 5 in a plurality of energy supply branches 3 or even to simultaneously charge all of the energy supply cells 5. A distribution of a current, which is fed by the energy source 10, to the individual energy supply branches 3 can be adjusted via the voltages of the energy supply branches 3. The voltages of the energy supply branches 3 are in turn determined by the number of energy storing cells 5 connected into the respective energy supply branch 3.

Undesirable moments during the charging process can also be prevented by virtue of the fact that the electric machine 1 is mechanically blocked during the charging process, e.g. with the aid of a transmission pawl. The rotor position of the electric machine 1 can also alternatively be monitored, e.g., with the aid of appropriate sensors, said electric machine being switched off in the event of a rotor movement being detected.

The invention claimed is:

1. A system for charging at least one energy storing cell in a controllable energy store that is used to control and supply electric energy to an n-phase electric machine, wherein n≥1,
   the controllable energy store having n parallel energy supply branches, which
      have respectively at least two serially connected energy storing modules,
   each said energy storing module comprising at least one electric energy storing cell with a corresponding controllable coupling unit,
      can be connected on the one hand to a reference bus and
      can be connected on the other hand to a phase of the electric machine,
   the coupling units bridging the respective corresponding energy storing cells or connecting said respective corresponding energy storing cells into the respective energy supply branch dependent on control signals,
   an external energy source being able to be connected on the one hand to the star point (S) of the electrical machine and on the other hand to the reference bus,
   wherein the external energy source is embodied as a voltage source, the voltage value of which lies below the voltages of the energy supply branches, and the coupling units can be operated in combination with motor inductances of the electric machine as boost converters, and
   wherein an additional charging inductance is connected between the energy source and the star point of the electric machine.

2. The system according to claim 1, wherein the energy source is embodied as a DC voltage source.

3. The system according to claim 1, wherein the energy source is embodied as an AC voltage source and the coupling units as full bridges.

4. A system for charging at least one energy storing cell in a controllable energy store that is used to control and supply electric energy to an n-phase electric machine, wherein n≥1,
   the controllable energy store having n parallel energy supply branches, which
      have respectively at least two serially connected energy storing modules,
   each said energy storing module comprising at least one electric energy storing cell with a corresponding controllable coupling unit,
      can be connected on the one hand to a reference bus and
      can be connected on the other hand to a phase of the electric machine, the coupling units bridging the respective corresponding energy storing cells or connecting said respective corresponding energy storing cells into the respective energy supply branch dependent on control signals, an external energy source being able to be connected on the one hand to the star point (S) of the electrical machine and on the other hand to the reference bus, wherein the controllable energy store has at least two parallel energy supply sources, a distribution of a current fed by the energy source can be adjusted to the energy supply branches via the voltages of said energy supply branches and the voltages of said energy supply branches are determined by the number of energy storing cells connected into the respective energy supply branch.

5. The system according to claim 4, wherein the external energy source is embodied as a current source.

6. The system according to claim 4, wherein the external energy source is embodied as a voltage source, the voltage value of which lies below the voltages of the energy supply branches, and the coupling units can be operated in combination with motor inductances of the electric machine as boost converters.

7. The system according to claim 6, wherein an additional charging inductance is connected between the energy source and the star point of the electric machine.

8. The system according to claim 4, wherein the energy source is embodied as a DC current source or as a DC voltage source.

9. The system according to claim 4, wherein the energy source is embodied as an AC current source or as an AC voltage source and the coupling units as full bridges.

10. A method for operating a charging system according to claim 4, the method comprising simultaneously charging energy storing cells in all of the energy supply branches.

* * * * *